United States Patent [19]

Hulthe

[11] 4,036,716
[45] July 19, 1977

[54] METHOD TO PREVENT THE FORMATION OF INCRUSTATIONS ON WORKING ELECTRODES IN ELECTRODE STEAM GENERATORS OR THE LIKE AND A MEANS FOR PERFORMING THE METHOD

[75] Inventor: Peter Hulthe, Vastra Frolunda, Sweden

[73] Assignee: Goteborgs Analyslaboratorium AB, Sweden

[21] Appl. No.: 561,080

[22] Filed: Mar. 24, 1975

[30] Foreign Application Priority Data

Apr. 5, 1974 Sweden ............................. 74045931

[51] Int. Cl.² .......................................... C23F 13/00
[52] U.S. Cl. ................................. 204/147; 204/196; 204/231
[58] Field of Search .......... 204/196, 147, 231, DIG. 8

[56] References Cited

U.S. PATENT DOCUMENTS

| 392,736 | 11/1888 | Kotyra | 204/196 |
|---|---|---|---|
| 1,558,647 | 10/1925 | Thalhofer | 204/196 |
| 1,576,581 | 3/1926 | Elmore et al. | 204/196 |
| 1,736,986 | 11/1929 | Thalhofer | 204/196 |

*Primary Examiner*—T. M. Tufariello

[57] ABSTRACT

The present invention relates to electrically heated steam generators and means for preventing and removing incrustations due to hard water in such generators. According to the invention this is achieved by means of a superimposed direct current the polarity of which is periodically changed whereby gas bubbles, mainly carbon dioxide and hydrogen, are generated at the electrodes causing segregation and removing of incrustations on the electrodes; the method and means for feeding of the superimposed direct current being variable.

13 Claims, 6 Drawing Figures

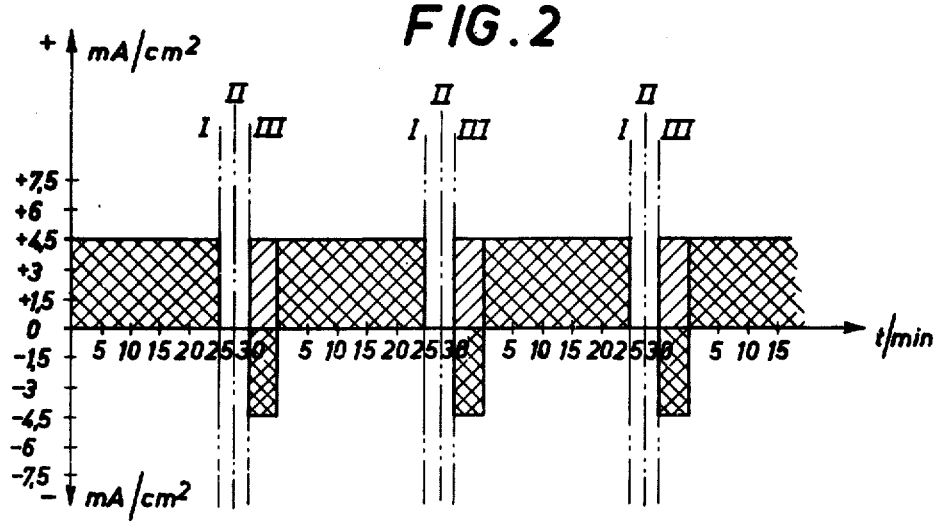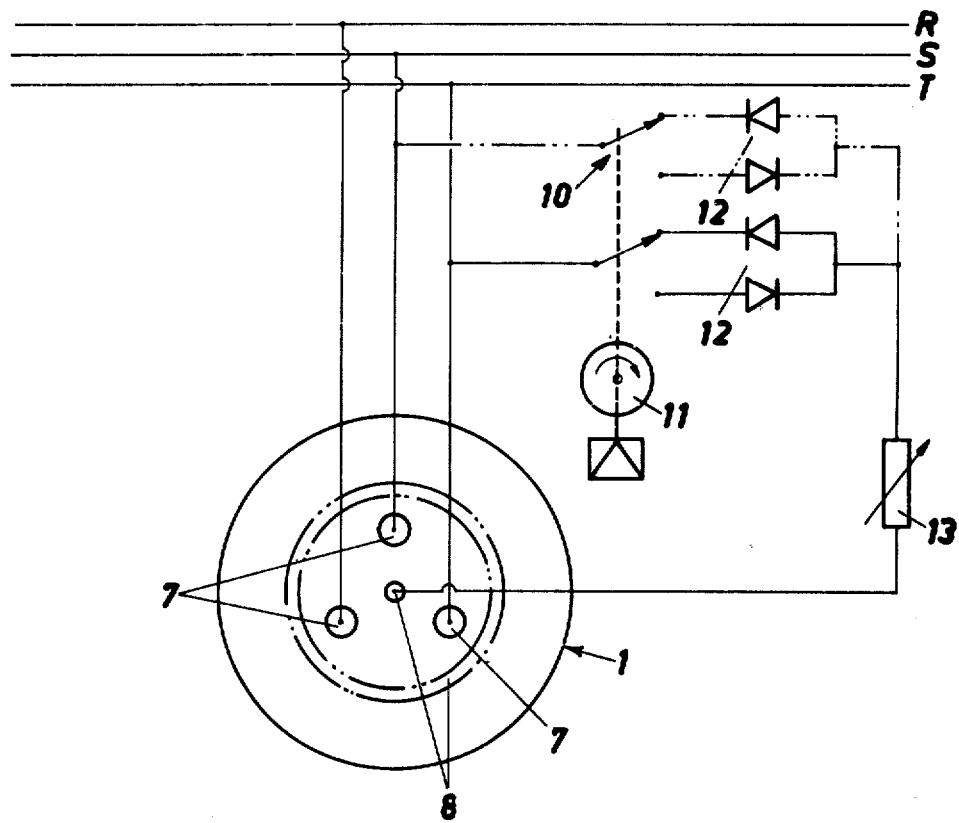

METHOD TO PREVENT THE FORMATION OF INCRUSTATIONS ON WORKING ELECTRODES IN ELECTRODE STEAM GENERATORS OR THE LIKE AND A MEANS FOR PERFORMING THE METHOD

BACKGROUND OF THE INVENTION

The present invention relates to a method to reduce or eliminate respectively a formation of incrustations on a working electrode connected to an alternating current means for an electrode steam generator or the like in a water containing liquid and means for performing the method.

SUMMARY OF THE INVENTION

On operation of such steam generators there often occurs a precipitation on the electrodes which comprises a chemically as well as physically relatively stable boiler incrustation. This forms an insulating layer between the electrode and the solution and thereby prevents the current flow in the vicinity of the electrodes. The precipitation can if allowed to be formed during a certain time become so thick, that the function of the steam generator is appreciately reduced. This often involves appreciable difficulties in removing the precipitation and the restoring of a normal function of the steam generator if the layer of the incrustation is thick. The precipitation mainly is made up of $CaCo_3$ (calcium carbonate) and $MgCo_3$ (magnesium carbonate) and often of smaller quantities of $CaSO_4$ (calium sulphate), $SiO_2$ (silicon dioxide) and traces of $FeO(OH)$ (ironoxide-hydrooxide).

The precipitation occurs due to the presence of ions from the salts in the water fed to the steam generator (hard water). The reason for the precipitation is that the solubility product of the carbonates involved is strongly dependent on the pH and that $CO_2$ (carbon dioxide) is evolved during the heating of the water. During the heating the pH increases whereby the solubility product for $CaCO_3$ (alternatively $MgCO_3$) is exceeded and a precipitation occurs. $CaSO_4$ and $SiO_2$ may thereby be coprecipitated. Should the content of sulphate an silicate be high enough. The reason for the precipitation on the electrodes is to be found among several circumstances or depend on a concurrance between said circumstances. The coated surface of the electrode may be warmer than the saturated solution causing a precipitating of salts with a negative coefficient of solubility, for instance $CaCO_3$ (calcium carbonate) from harder water. The surface of the electrode may be that hot, that boiling occurs, causing evaporation of water and concentration gradient to the rest of the liquid. If the solubility product for a salt the ions of which are contained in a solution is exceeded the precipitation occurs very close to the surface which may cause adherence. This is true for the evaporation of most difficult soluble metal salts.

It is previously known that graphite a deposition on the botton of water heaters may prevent a deposition of incrustations, the electrodes being arranged in an upper part of the same. The graphite deposition and the electrodes are connected to a direct current circuit whereby the electrodes will have a negative potential and the graphite deposition a positive potential. Through the following electrolyse incrustations will be deposited on the cathodes while the anode will be free from deposition.

It has been shown that a change of the polarity between the electrodes and the graphite deposition result in a loosening of incrustations from the electrodes, and that new incrustation instead is formed on the graphite deposition. Through repeated changes of the polarity there is attained a certain protection against the formation of a crustation.

In electrode steam generators where the electrodes are used for heating of surrounding water an operated with alternating current and the electrodes periodically and alternatingly are anodes and cathodes, it could be supposed that the same protection against precipitation on the electrodes would occur as in the above mentioned water heater. Unfortunately, this is not the case as the duration of a half period during which a polarity at an electrode is constant (about 10 millisec at 50 Hz mains frequency) is too short to attain the effect mentioned.

A purpose according to the present invention is to accomplish a device which renders it possible to prevent a deposition on working electrodes connected to a source of alternatingcurrent in a electrolytical way. The problem according to the invention has been solved by superimposing direct current voltage over at least one of the working electrodes or helping electrode respectively with respect to one or the other of the remaining working electrodes and by changing the superimposed direct current voltage intermittently between the electrodes in such a way that they periodically work as anodes and as cathodes.

BRIEF DESCRIPTION OF THE DRAWINGS

FIG. 2 shows a time-current-density-diagram for one of the working electrodes.

FIG. 3 shows the circuit for directly feeding of the auxiliary electrode.

DESCRIPTION OF THE PREFERRED EMBODIMENT

Figure 1:
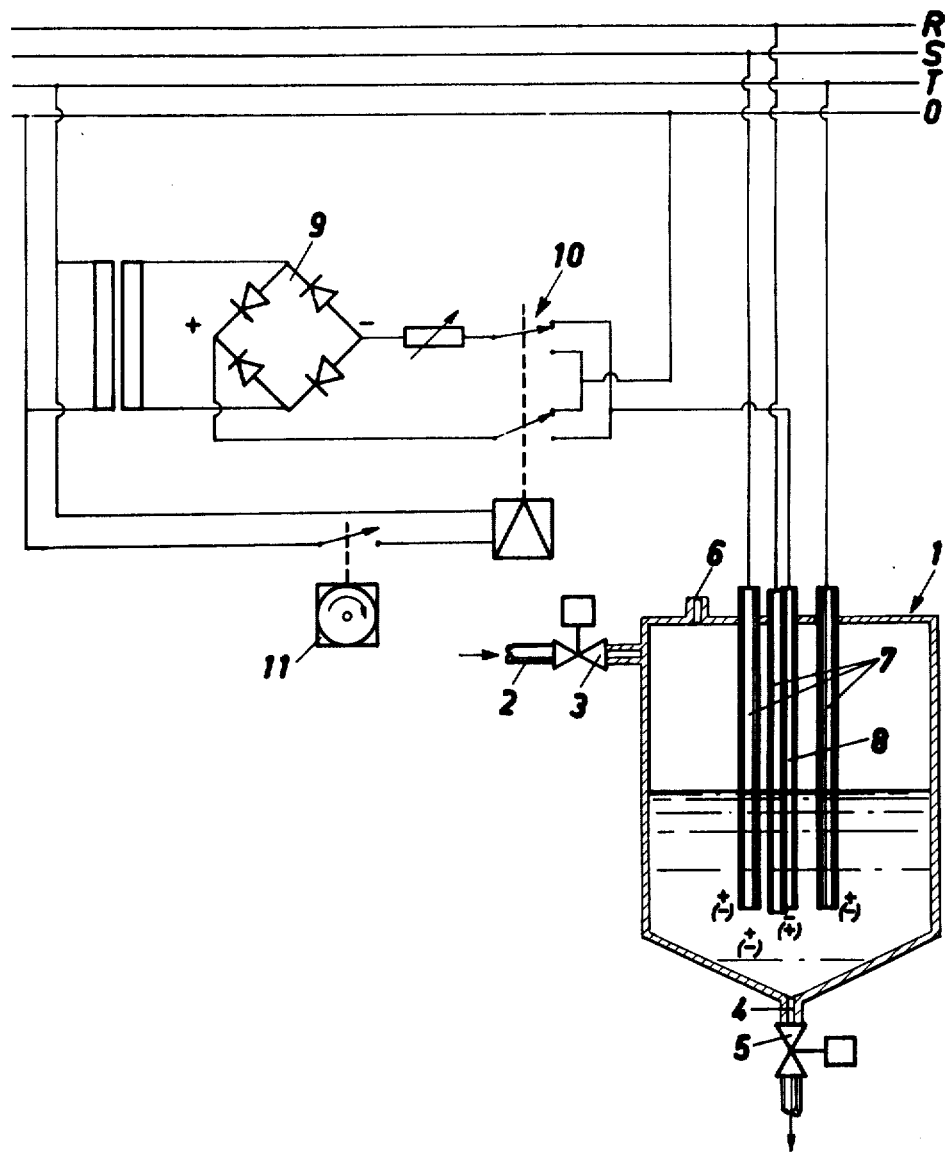
FIG. 1 shows a simplified circuit diagram of a three phase steam generator with transformer feeding to the auxiliary electrode.

In the drawings 1 denote a steam generator or the like comprising a vessel with supply a pipe 2 for water, a closing valve 3 in the supply pipe, an outlet pipe 4 in the bottom of the vessel, and a closing valve 5 in the outlet pipe. In the upper part of the vessel (top cover) an outlet 6 is arranged for the steam generated and further three working electrodes 7 and an auxiliary electrode 8 which are placed so that they are submerged in the liquid in the vessel. In the modification shown in FIG. 1 the three working electrodes 7 are connected to a three phase alternating current mains.

Due to the direct connection of the working electrodes to the source of alternating current the electrodes will continuely alter polarity concurrent with the number of periodes/sec. During the short time the polarity is constant there cannot occur a sufficient large change of the pH in the space closest to the electrodes and therefore it will be necessary to force a superimposed potential difference either between the working electrodes or between an auxiliary electrode and the working electrodes. In the embodiment shown in FIG. 1 this has been attained by forcing a potential from an outer source of direct current upon the electrodes. The direct current is generated by means of a full wave rectifier with a bridge 9 the positive an negative side of which is connected to a pole changer relay 10 which is tripped by a programming device 11 (timer). According to the circuit diagram (FIG. 1) the positive side of the bridge 9 is connected to the zero of the alternating current mains and thus positive potential is super imposed. At the same time the auxiliary electrode 8 is connected to the negative side of the bridge 9 which means that the auxiliary electrode is negative and thus works as a cathode at which the following cathode reaction may occur:

$$HCO_3^- + e^- \rightarrow \tfrac{1}{2} H_2 (g) + CO_3^{2-}$$

The precipitation of water hardness immediately occurs on the surface o the electrode:

$$CO_3^{2-} + Ca^{2+} \rightarrow CaCO_3 \text{ (analogical for } Mg^{2+}\text{)}$$

The working electrodes will through the couppling function as anodes and therefore do not receive any precipitation, but remain clean. Hydrogene ions are formed according $$H_2O \rightarrow \tfrac{1}{2} O_2 + 2H^+ + 2e^-$$

which ions initially raise the hydrogene carbonate content in the solution in the vicinity of these electrodes prevent precipitation according to $$CO_3^{2-} + H^+ \rightarrow HCO_3^-$$

the continued reaction will be $$HCO_3^- + H^+ \rightarrow CO_2 (g) + H_2O$$

whereby the total alkalinity of the system is reduced and the tendency for precipitation will become essentially less.

After a time of directing of $CaCO_3$ and $MgCO_3$ to the surface of an auxiliary electrode (the time, i.a., being dependent on the hardness of the water), the direction of the current is reversed and the auxiliary electrode becomes anode:

$$H_2O \rightarrow \tfrac{1}{2} O_2 (g) + 2H^+ + 2e^-$$

The hydrogen ions rapidly dissolve the $CaCO_3$ according to $$CaCO_3 + 2H^+ \rightarrow Ca^{2+} + CO_2 (g) + H_2O$$

which adheres to the surface of the electrode the scale of calcium carbonate losing its adhesion. The bubbles of oxygene and carbon dioxide formed cracks the not yet too thick incrustation which is segregated and falls to the bottom of the boiler.

The protection current density of the working electrodes should in case of middle hard and hard waters (> 10° dh) be about 5 mA/cm$_2$, but due to corrosion problems none of the electrodes should essentiallyexceed this value. This depends on the material of the working electrodes and the example relates to a certain quality of graphite electrodes. Under about 3 mA/cm$^2$ the protection will be less effective which means that the auxiliary electrode 8 should be centrally placed between the working electrodes and in the same distance from these. Instead of a rod as auxiliary electrode it is also possible to arrange the auxiliary electrode in the form of a ring (indicated with dot and dash lines in FIG. 3) which incloses the working electrodes which arrangement is specially suitable for one phase steam generators. The surface of a auxiliary electrode should be smaller than the total surface of a working electrode (electrodes) or in any case not greater since the latter is unfavorable when the auxiliary electrode is the anode and the incrustation is to be cracked away. The material of the auxiliary electrode should be resistant against corrosion. Graphite or gold plated copper have given good results during long use in certain investigated waters. Shrinking tubing of PVC and (still better) Teflon has been used to screen of parts of the auxiliary electrode whereby a reduction of the outer dimensions of the auxiliary electrode in other ways have been prevented.

In case of very hard water and three phase operation at 15 A and an auxiliary electrode of 60 cm$^2$ the formation of calcium carbonate precipitation on the auxiliary electrode 8 should be interrupted after about 25 – 30 min and with less and with less hard water after somewhat longer time. Through the pole changing of the rectifier the working electrodes will become cathodes and the auxiliary electrode anode during a time determined by the current density at the auxiliary electrode a cleaning of the auxiliary electrode will occur during about 5 min. This period is that short that the incrustation of the working electrodes which occurs automatically will be removed in the following phase after pole changing. If the same direct current density is used at the working electrodes during the cleaning period as during the precipitation period, that is +4,5 mA/cm$^2$, the cleaning period may be limited to a few minutes as shown in the diagram according to FIG. 2. Before or after the cleaning period the vessel suitably is emptied, flushed and refilled. In the diagram of FIG. 2 the emptying phase is denoted I, the flushing phase II and the refilling phase III.

In certain cases (with a small surface of the auxiliary electrode) it may be suitable to alter the polarity intermittently during the cleaning phase, for instance in intervals of 10 sec, during which time the auxiliary electrode is anode during 10 sec, cathode during 10 sec, anode during 10 sec and so on until the cleaning phase is interrupted (for instance 2 min). It is also possible to use another current density at the auxiliary electrode during this period, for instance considerable higher density.

The rests of the incrustation which have been segregated during the cleaning period exist in a christalline form and have no tendency to adhere other on the electrodes or the wall of the vessel, instead these rests may be flushed out in connection with the drainage of the water from the vessel.

The embodiment shown in FIG. 3 is used for a boiler or a steam generator connected to a three phase mains. The auxiliary electrode is connected between the working electrodes and the current from one of the phases, the phase T in the example, is half way rectified over an invertable retifier 12 which gives the auxiliary electrode 8 a negative potential. A current restricting resistor 13 is arranged in series with the rectifier. At suitable time intervals (depending on the water hardness) the auxiliary electrode is cleaned by changing the polarity by means of a timer whereby the auxiliary electrode will be effective as anode. In order to obtain a more even condensity (more symmetrical protection) for the working electrodes it is suitable to feed the auxiliary electrode from two or still better from all of the three phases (only one phase feeding is shown) the differences in current density for the working electrodes is reduced or eliminated.

Figure 4:
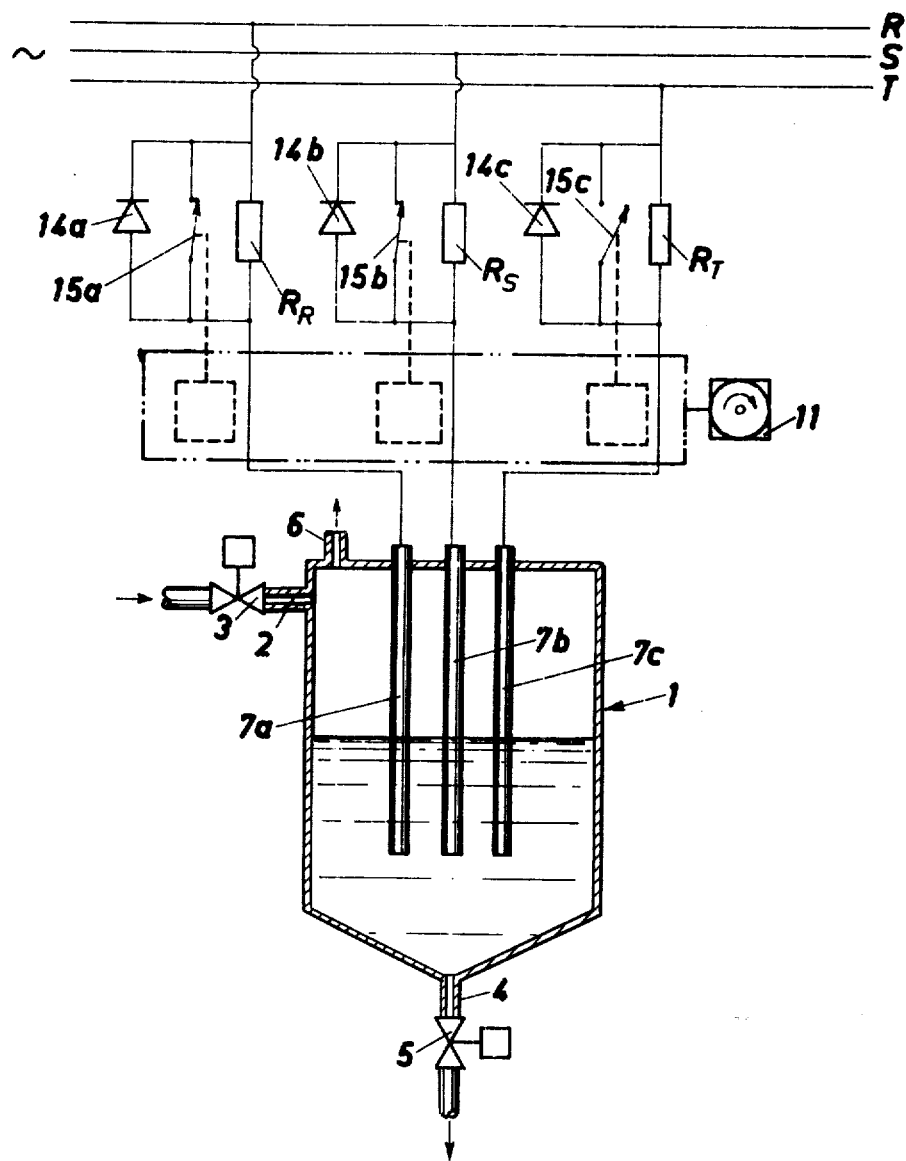
FIG. 4 shows a circuit diagram for a further embodiment with a direct feeding of the electrodes and a superimposed direct current voltage.

In the embodiment according to FIG. 4 a direct current potential drop is attained in one of the feeding lines (T-phase). The resistors $R_R$, $R_S$ and $R_T$ are connected in series with the working electrodes 7 and all have the same resistance. The resistances are overbridged by switches 15 and diodes 14. By the fact that the switch 15c is open in the case shown a small part of the current will pass through the resistor $R_T$ to the electrode 7c fed by the T-phase. The main part of the current passes through the diod 14c and is thereby rectified and with the polarity of the diod according to FIG. 4 the R- an S-fed electrodes 7a and 7b will get a positive superimposed direct current potential against the T-fed electrode 7c. By closing the switch 15c and opening the switch 15a after a certain time the R-phase electrode 7a will become cathode relatively to the two other electrodes. Hereafter, the switch 15a may be closed and the switch 15b opened. The cathode function is than changed over to the S-phase electrode 7b. If, for instance, the switches are replaced by three relays and the tripping of these is arranged as a timer a coating period and a cleaning period is attained for each electrode in the same way as in the above embodiments. In the device, the diods may also be turned in the opposite direction as shown in the Figure. The function will then essentially be the same.

Figure 5:
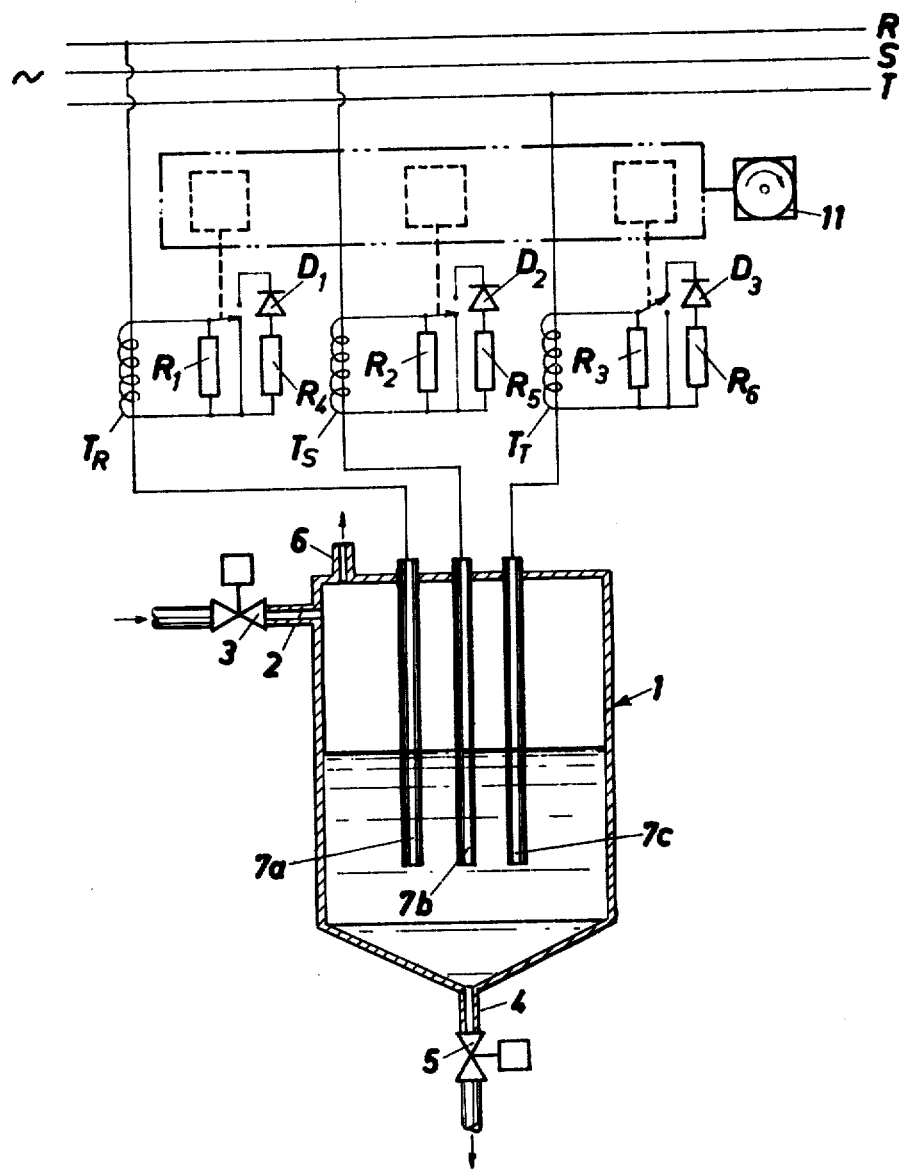
FIG. 5 shows an analogially embodiment as in FIG. 4 but with a somewhat differing coupling.

FIG. 5 shows an embodiment which principally is very close to that one of FIG. 4 but with the difference that in this case the series load of the feeding current is inductive instead of purely resistive as in the above example. The current transformers $T_R$, $T_S$, and $T_T$ replace the resistors $R_R$, $R_S$, and $R_T$ in FIG. 4. Loss of effect occurs except at the electrodes in the water also in the resistors $R_3$ and $R_6$. The current through $R_6$ is rectified whereby the current transformer $T_T$ is polarised giving the electrode 7c a direct current potential against 7a and 7b. $R_1$, $R_2$, and $R_3$ are intended to protect the current transformers against short circuiting in the moment of switching. The switches are tripped in the same way as shown in FIG. 4 and the function of the device shown is for the remaining part the same. The advantages with the circuit is that the rectifier, the switches and the resistors for effect losses are galvanically separated from the feed lines from the 380-Volt mains which is favorable in view of personal security, for instance on service of the device.

Figure 6:
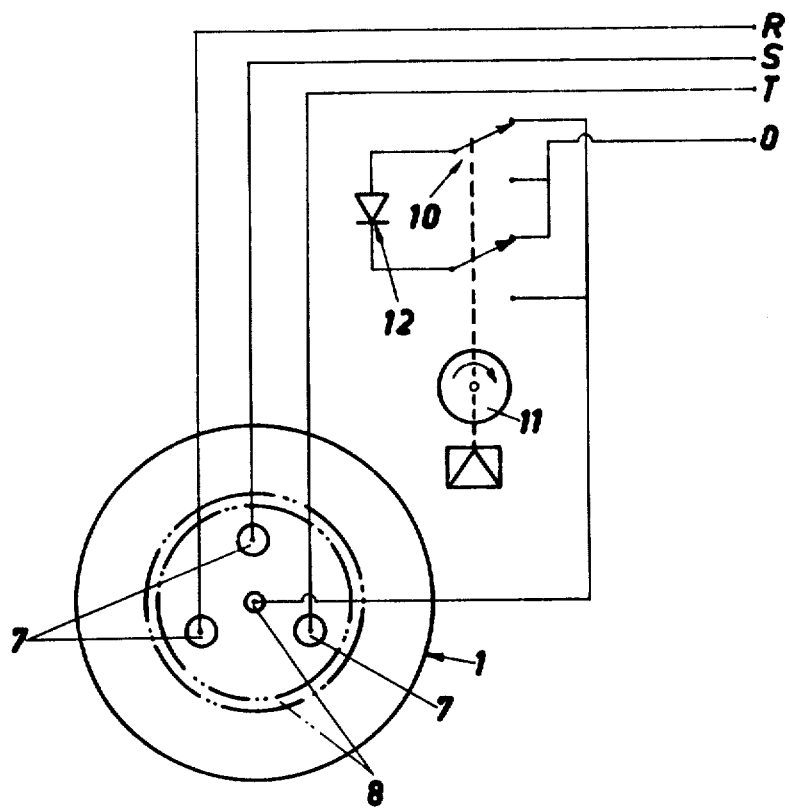
FIG. 6 shows a somewhat different coupling, here called "Parasitic feeding" of the electrodes.

The coupling according to FIG. 6 differs from the above described in that the direct current is superimposed an arbitrary electrode, the arbitration, i.a., being dependent on the conditons prevailing on the liquid surrounding the individual electrodes. This is achieved as shown in the drawing by connecting the zero of the three phase mains to the electrode 8 over a rectifier 12, the low of current to and from said auxiliary electrode being reversible by the switch 10 and possibly in combination with a timer 11.

The invention is not limited to the embodiments shown as several modifications are possible within the scope of the claims.

What I claim is:

1. A method for reducing or eliminating the formation of incrustations of water soluble materials on working electrodes which are immersed in a water bath containing said water soluble materials, said electrodes being connected to a source of alternating current, said improvement comprising the steps of:
   adding an auxiliary electrode;
   superimposing, between said auxiliary electrode and said working electrodes, a direct current voltage such that a low PH-value is obtained in the water near the working electrodes; and
   reversing, periodically, the direct current polarity such that the working electrodes and the auxiliary electrode periodically act as an anode and as a cathode causing the PH-value of the water to vary between acidic and alkaline.

2. A method to reduce or to eliminate respectively the formation of incrustations on working electrodes immersed in a water containing steam generator, said electrodes being connected to a source of alternating current and a source for superimposing the working electrodes a direct current according to claim 1 wherein the direct current is fed to an auxiliary electrode the polarity of which is intermittently changed.

3. A method to reduce or to eliminate respective the formation of incrustations on working electrodes immersed in a water containing steam generator, said electrodes being connected to a source of alternating current and a source for superimposing the working electrodes a direct current according to claim 1 wherein the direct current is superimposed the working electrodes successively from an outer timed source of direct current.

4. A method to claim 1, wherein the intervals between the changes of polarity are of different length.

5. A method according to claim 4, wherein the polarity is repeatedly changed for short time periods during the cleaning phase between two precipitation phases.

6. A method according to claim 5, wherein the electrode working as a cathode is impressed changes of polarity of short duration and with a greater current density than during the precipitation phase during the cleaning phase.

7. A method to reduce or to eliminate respectively the formation of incrustations on working electrodes immersed in a water containing steam generator, said electrodes being connected to a source of alternating current and a source for superimposing the working electrodes a direct current wherein the superimposed direct current with alternating polarity is fed the working electrodes from an auxiliary electrode preferably centrally positioned in relation to the working electrodes, the direct current flowing from a zero phase and the other phases of an alternating current mains over a rectifier for generating a parasitic flow of direct current dependent on the conditions prevailing in the electrolyte.

8. In a device for the generation of steam utilizing a source of alternating current applied to working electrodes immersed in water, an improvement comprising an apparatus for the reduction of incrustations on said working electrodes, said apparatus comprising:
   means for imposing a direct current upon said working electrodes; and
   means for periodically reversing the direct current in imposed upon said working electrodes.

9. In a device for the generation of steam utilizing a source of alternating current to working electrodes immersed in water, an improvement comprising an apparatus for the reduction of incrustations on said working electrodes, said apparatus comprising;

auxiliary means for providing an additional electrode;
means for imposing a direct current between said working electrodes and said auxiliary means; and
means for periodically reversing the direct current imposed between said auxiliary means and said working electrodes.

10. A device according to claim 9, wherein the surface of said auxiliary electrode is smaller than the total surface of the working electrodes.

11. A device according to claim 9 wherein said auxiliary electrode comprises a corrosion resistant material, selected from a group comprising graphite or gold plated copper.

12. In a device for the generation of steam utilizing a source of alternating current applied to working electrodes immersed in water, an improvement comprising an apparatus for the reduction of incrustations on said working electrodes, said apparatus comprising:

means for imposing a direct current upon selected working electrodes;
means for varying which of said working electrodes has said direct current imposed upon it; and
means for periodically reversing the direct current imposed upon said selected working electrodes.

13. The apparatus of claim 8 wherein said means for imposing includes rectifier means connected to said alternating current source.

* * * * *